United States Patent [19]

Hopper

[11] Patent Number: 5,370,926
[45] Date of Patent: Dec. 6, 1994

[54] PACKING MATERIAL

[75] Inventor: Chester S. Hopper, Newtown, Conn.

[73] Assignee: The Marlo Company International, Newtown, Conn.

[21] Appl. No.: 967,960

[22] Filed: Oct. 27, 1992

Related U.S. Application Data

[63] Continuation of Ser. No. 595,643, Oct. 10, 1990, abandoned, which is a continuation of Ser. No. 24,218, Mar. 10, 1987, abandoned.

[51] Int. Cl.$^5$ .......................... D06D 7/00; B32R 27/00; D02G 3/00; D02G 3/02
[52] U.S. Cl. ........................ 428/241; 428/244; 428/245; 428/253; 428/254; 428/323; 428/367; 428/373; 428/377; 428/428; 87/1; 87/6; 87/8
[58] Field of Search ............... 428/241, 244, 245, 253, 428/254, 323, 367, 373, 377, 421; 87/1, 6, 8

[56] References Cited

U.S. PATENT DOCUMENTS

| | | | |
|---|---|---|---|
| 3,306,155 | 2/1967 | Zumeta et al. | 87/1 |
| 3,438,841 | 5/1969 | Zumeta et al. | 57/244 X |
| 3,534,652 | 10/1970 | Zumeta et al. | 87/1 |
| 3,646,846 | 3/1972 | Houghton et al. | 87/1 |
| 3,791,658 | 2/1974 | Zumeta et al. | 87/1 |
| 3,844,195 | 10/1974 | Rhodes et al. | 57/244 X |
| 4,026,863 | 5/1977 | Iseki et al. | 428/361 X |
| 4,050,701 | 9/1977 | Webb | 528/388 X |
| 4,056,594 | 11/1977 | Carrow | 528/388 X |
| 4,298,207 | 11/1981 | Hopper et al. | 87/1 |
| 4,371,180 | 2/1983 | Case et al. | 277/230 |
| 4,431,698 | 2/1984 | Case et al. | 428/244 |
| 4,502,364 | 3/1985 | Zucker et al. | 428/373 X |
| 4,559,862 | 12/1985 | Case | 428/367 X |

Primary Examiner—Patrick J. Ryan
Assistant Examiner—Richard Weisberger
Attorney, Agent, or Firm—Stroock & Stroock & Lavan

[57] ABSTRACT

A packing material having improved chemical resistance formed of poly(phenylene) sulfide yarn and polytetrafluoroethylene yarn is provided. Each of the yarns may be treated with PTFE dispersion and, optionally, with graphite. The two yarns may be twisted together or laid-up side-by-side and braided together and the structure may be impregnated with a polytetrafluoroethylene based binder and lubricant. The resulting packing material has improved temperature characteristics, heat transfer characteristics, wear resistance, provides a dense impervious packing and is dimensionally stable in addition to the improved chemical resistance. A packing material prepared from yarns treated only with a PTFE dispersion is especially useful in the paper making industry and for other applications wherein dark colored yarns are not permissible.

14 Claims, 2 Drawing Sheets

PACKING MATERIAL

This is a continuation of U.S. patent application Ser. No. 07/595,643, now abandoned filed on Oct. 10, 1990 which is a continuation of application Ser. No. 07/024,218, now abandoned filed on Mar. 10, 1987 for PACKING MATERIAL.

BACKGROUND OF THE INVENTION

This invention relates generally to packing materials and, in particular, to a packing material that is useful for sealing mechanical pumps.

Packing materials of the type described herein are used mechanical pumps at junctions where a rotary shaft or reciprocating rod extends into a fluid-filled cavity. The fluid-filled cavity can be filled with any of a wide range of chemical fluids or solvents, many of which are highly corrosive. It is important that the packing material be resistant to these corrosive chemicals.

In addition to chemical resistance, suitable packing materials should withstand fluid temperatures or heat generated by mechanical friction of up to about 500° F., while functioning to assist in the dissipation of heat. The packing material must exhibit minimal thermal dimensional change so that the fluid filled cavity remains sealed in such a way as to prevent leakage. Accordingly, the packing materials should be sufficiently resilient to retain their original shape under thermal, chemical and mechanical actions.

Packing materials for these purposes are known. Until several years ago, asbestos was a standard widely used material for braided "compression" packings. However, asbestos use has fallen into disfavor since its carcinogenic properties have become known. Various packing materials have been proposed and several are satisfactory for some applications.

For example, several utilize glass or an inorganic fiber as proposed in U.S. Pat. No. 3,306,155 issued to Zumeta and Case on Feb. 28, 1967 who disclose a braided packing material having glass braids impregnated with polytetrafluoroethylene resin. The braided structure can be enclosed in a polytetrafluoroethylene jacket.

Similarly, Zumeta and Case in U.S. Pat. No. 3,534,652 issued on Oct. 20, 1970 disclose a high temperature packing material formed of a braided core of glass or silicon dioxide filaments impregnated with molybdenum disulfide. The core can be provided with a surface coating of molybdenum disuifide and/or a braided graphite jacket.

U.S. Pat. No. 4,371,180 to Case and Hopper on Feb. 1, 1983 discloses a gasket material that combines a braided organic fiber with a vitreous fiber sleeve. The gasket material is impregnated with polytetrafluoroethylene as a sealant. In another embodiment, a sleeve is braided of yarn containing both inorganic and organic fibers that are either spun or twisted together. The use of vitreous fibers makes it possible to use the gasket material to retain fluid at pressures higher than are possible with organic fiber alone.

U.S. Pat. No. 4,298,207 issued to Hopper et al on Nov. 3, 1981 discloses a gasket material having a resilient core of glass fiber and a jacket of glass or other suitable fiber over the core. An essentially impermeable sheath of a chemically resistant material can be provided between the jacket and the core. Both the jacket and core can be impregnated with polytetrafluoroethylene.

U.S. Pat. No. 4,431,698 issued to Case et al on Feb. 14, 1984 discloses a low friction, water and steam resistant packing containing an inorganic fiber in combination with dispersed and dried, but unsintered, polytetrafluoroethylene. The inorganic fiber can be any of chemical, electrical, structural and alkali resistant glasses, ceramic, quartz, carbon and graphite materials. The packing is prepared by combining the inorganic fiber with a polytetrafluoroethylene dispersion containing a wetting agent and heating the resulting combination to a temperature high enough to decompose the wetting agent but insufficient to sinter the particles of the dispersion. Accordingly, a packing that is essentially free of a wetting agent is prepared.

U.S. Pat. No. 4,559,862 issued to Case et al on Dec. 24, 1985 discloses a packing material comprising glass or other inorganic fibers in combination with an organic fiber such as sintered polytetrafluoroethylene. The packing material can be used either with or without an impregnant. Preferred impregnants include lubricants with a binder.

All organic packings in U.S. Pat. No. 3,791,658 to Zumeta and Case on Feb. 12, 1974 have an inner Teflon-containing core and an outer carbon-containing jacket surrounding the core. The core can be Teflon fiber or Teflon impregnated packing material such as asbestos or fiberglass. The outer jacket can be a graphite filament that is either wrapped or braided around the core. Similarly, Houghton et al in U.S. Pat. No. 3,646,846 which issued on Mar. 7, 1972 disclose a packing material comprising graphite strands with interstices between the strands that are thoroughly impregnated with an impregnating material of a fluorocarbon resin and a solid lubricant such as graphite.

These prior art packing materials are suitable for some applications, but are not completely satisfactory, particularly in high temperature highly corrosive applications. Accordingly, it is desirable to provide an improved packing material having superior properties.

SUMMARY OF THE INVENTION

Generally speaking, in accordance with the invention, an improved packing material formed from chemically resistant organic fibers is provided. The fibers are poly(phenylene sulfide) and polytetrafluoroethylene. The fibers are formed into yarn which is treated with PTFE. Carbon particles may be added to either or both of the yarns. The yarns may be knitted, braided or twisted into the packing. The resulting structure is impregnated with PTFE or PTFE and carbon, calendered and a petroleum or synthetic based lubricant is added. The packing material has excellent chemical resistance, temperature characteristics, heat transfer characteristics, wear resistance, provides a dense impervious packing and is dimensionally stable.

Accordingly, it is an object of the invention to provide an improved packing material suitable for use over a wide range of temperatures.

Another object of the invention is to provide a packing material that is suitable for use as a sealant for a wide range of solutions and solvents.

A further object of the invention is to provide a packing material that retains its effectiveness at high shaft speeds.

Yet another object of the invention is to provide a packing material having high thermal conductivity.

A still further object of the invention is to provide a packing material combining two different organic yarns that are braided, twisted or knitted together.

Still another object of the invention is to provide a packing material having controlled resilience and that is non-extruding.

Still a further object of the invention is to provide a packing material lubricated with a polytetrafluoroethylene binder and/or another lubricant.

Another object of the invention is to provide a packing material that is resistant to contamination.

A still further object of the invention is to provide a packing material that is useful for applications where the use of carbon or other dark colored materials is not permitted.

Still other objects and advantages of the invention will in part be obvious and will in part be apparent from the specification.

The invention accordingly comprises the several steps and the relation of one or more of such steps with respect to each of the others, and the article possessing the features, properties, and the relation of elements, which are exemplified in the following detailed disclosure, and the scope of the invention will be indicated in the claims.

BRIEF DESCRIPTION OF THE DRAWINGS

For a fuller understanding of the invention, reference is had to the following description taken in connection with the accompanying drawings, in which.

DESCRIPTION OF THE PREFERRED EMBODIMENTS

Figure 1:
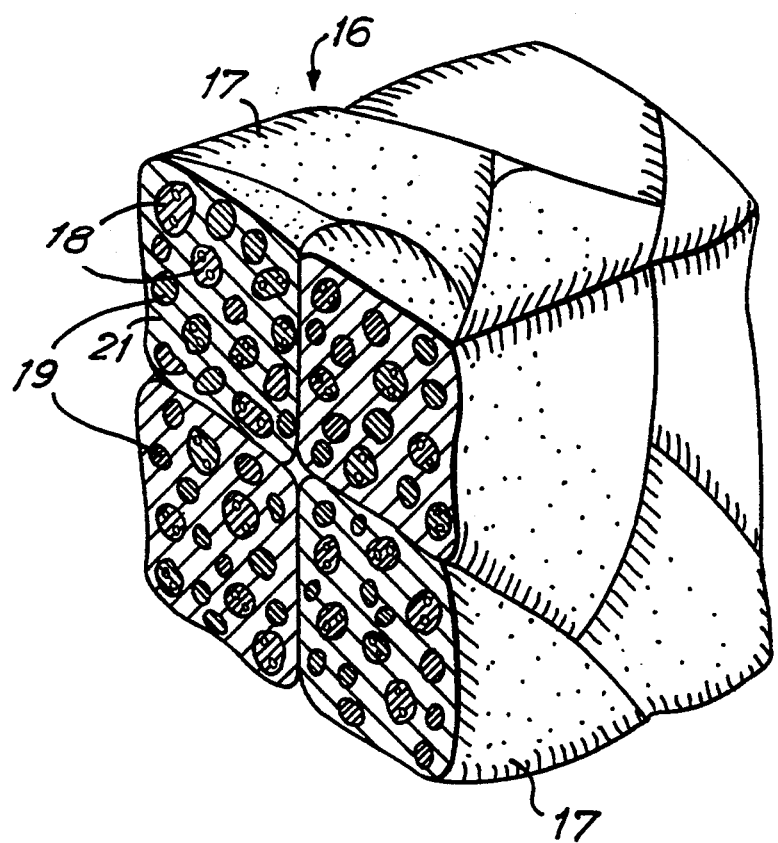
FIG. 1 is a cross-sectional perspective view of a packing material formed from strands of poly(phenylene sulfide) and PTFE yarns, the packing impregnated with graphite and a lubricant in accordance with the invention.

The packing material prepared in accordance with the invention combines (1) poly(phenylene sulfide) yarns treated with a blend of PTFE dispersion and fine carbon, and (2) PTFE yarn combined with carbon particles to increase the strength of the packing compared to a packing of PTFE with carbon particles alone. The poly( phenylene sulfide ) yarn has similar chemical and thermal capabilities to the PTFE-carbon composite, but is much more stable due to its higher modulus of elasticity and twisted strand composition. This combination of poly(phenylene sulfide) and PTFF-carbon will not extrude as PTFE-carbon alone due to the matrix-like support provided by the poly(phenylene sulfide) yarn and the complete impregnation throughout the composite structure.

Poly(phenylene sulfide) fiber is a linear high molecular weight polymer suitable for fiber melt spinning. Yarns formed from poly(phenylene sulfide) yarn has outstanding heat resistance, good physical properties, excellent chemical resistance, good electrical properties and is a self extinguishing flame retardant. The fiber and yarn exhibit limited solubility in a few solvents above about 390° F.

Poly(phenylene sulfide) yarn can be used as a packing material when impregnated with polytetrafluoroethylene. Such a packing material has acceptable chemical resistance and dimensional stability, good wear resistance and a temperature limit of up to about 450° F. However, the heat transfer capability is limited.

The yarn of polytetrafluoroethylene in the preferred embodiment is impregnated with carbon particles in combination with a PTFE dispersion to hold the carbon particles. One such PTFF-carbon composite yarn is sold by W.L. Gore & Associates, Inc. of Elkton, Md. under the trademark GFO ® yarn. GFO ® yarn is a combination of polytetrafluoroethylene, graphite and a high temperature lubricant. Polytetrafluoroethylene is one of the most chemically resistant substances available. Graphite is similarly chemically inactive over the entire pH range with the exception of strong oxidizers such as aqua regia, fuming nitric acid, fluorine, oleum and the like, generally having pH values in the range 0-2. The high temperature lubricant is also inactive.

The PTFE-carbon composite yarn can withstand temperatures up to about 500° F. (260° C.) and in some cases up to about 550° F. (288° C.), depending on the lubricant. Such yarn have high thermal conductivity and good heat transfer properties as well as a low coefficient of thermal expansion. The yarn are non-abrasive, withstand high shaft speeds, are black in color and do not harden making it easy to install and remove the packing.

When a PTFE-carbon composite yarn is used alone as a packing material, a usable packing having good chemical resistance, a temperature limit of up to about 500° F., good built-in lubricity and excellent heat transfer capabilities results. However, the PTFE-carbon composite yarn is a relatively soft yarn extrusion and dimensional instability can result when it is used in many industrial applications. For example, problems occur when such yarns are used in a high temperature environment and/or a high pressure application. These problems can be magnified when the mechanical device is worn and larger than normal clearances exist between the sealing members. Since PTFE-carbon composite yarn do not readily accept a final impregnation to seal the interstices of the packing and make the packing less dense, contamination in the small voids is a problem. Such contamination may abrad a rotating or reciprocating shaft, thereby contributing significantly to the wear of the sealing members.

In accordance with the invention, a packing material that is a combination of the two yarns, a combination of poly(phenylene sulfide) and polytetrafluoroethylene is provided. In the preferred embodiments both yarns are impregnated with carbon particles as described above. The final structure can be impregnated with a binder or lubricant, such as polytetrafluoroethylene.

A packing in accordance with the invention is prepared as follows. Poly(phenylene sulfide) yarns are treated with a blend of an aqueous PTFE dispersion and fine carbon particles (MDS-4). The poly(phenylene sulfide) yarns and PTFE-carbon composite yarns are twisted into filaments and then braided into the final configuration of the packing as shown in the Figures. Additional carbon particles may be added to the braided packing which is then calendered to size. Finally, a petroleum or synthetic lubricant is placed on the packing. As described in more detail below, various configurations are available. The individual yarns first may be formed into strands which are then braided. The specific physical configuration is not significant so long as both the poly(phenylene sulfide) and PTFE-carbon composite yarns are both present in the final structure.

A structure based on the combination of a poly(phenylene sulfide) fiber with a PTFE-carbon composite fiber is shown in FIG. 1. A braided structure indicated generally by reference numeral 16 is formed of a plurality of strands 17 of a poly(phenylene sulfide) fiber 18 and a PTFE-carbon composite fiber 19. Poly(phenylene sulfide) yarns 18 and PTFE-carbon composite yarns 19 can be laid up together, twisted together or spun together. The space between yarns 18 and 19 is filled with an impregnate 21. Impregnate 21 may be a dispersed organic material, such as polytetrafluoroethylene or graphite and/or an inorganic material, such as a metal disulphide or talc. An organic binder, such as dispersed polytetrafluoroethylene, graphite or starch, can be used either alone or in combination with an inorganic material. The content of organic binder in the impregnate may be between about 0 and 100%.

Structures using two different organic yarns are particularly useful for reciprocating shafts. However, they are also useful for rotating shafts. In general, each organic yarns should be used in an amount between about 25 and 75% by weight with the total amount of both yarns being 100% in order to provide a packing material with a significant useful life. In an especially preferred embodiment, each yarn is used in an amount of about 50% by weight. The preferred organic binder is polytetrafluoroethylene dispersion. The preferred inorganic lubricant, on a cost basis, includes graphite, generally available as an aqueous dispersion. When graphite is present as a lubricant, corrosion of the metals in contact with the packing may result. In such circumstances a minor quantity of powdered zinc is added as a corrosion inhibitor.

Figure 2:
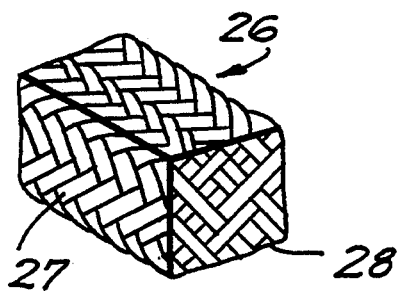
FIG. 2 is a cross-sectional perspective view of a packing material constructed and arranged in accordance with the invention using a cross-lock construction.

In the embodiment of FIG. 2 a packing material 26 prepared using a cross-lock construction is shown. The diagonal construction is shown at a cut end 28. Each of strands 27 include poly(phenylene sulfide) yarn and a PTFE-carbon composite yarn.

Figure 3:
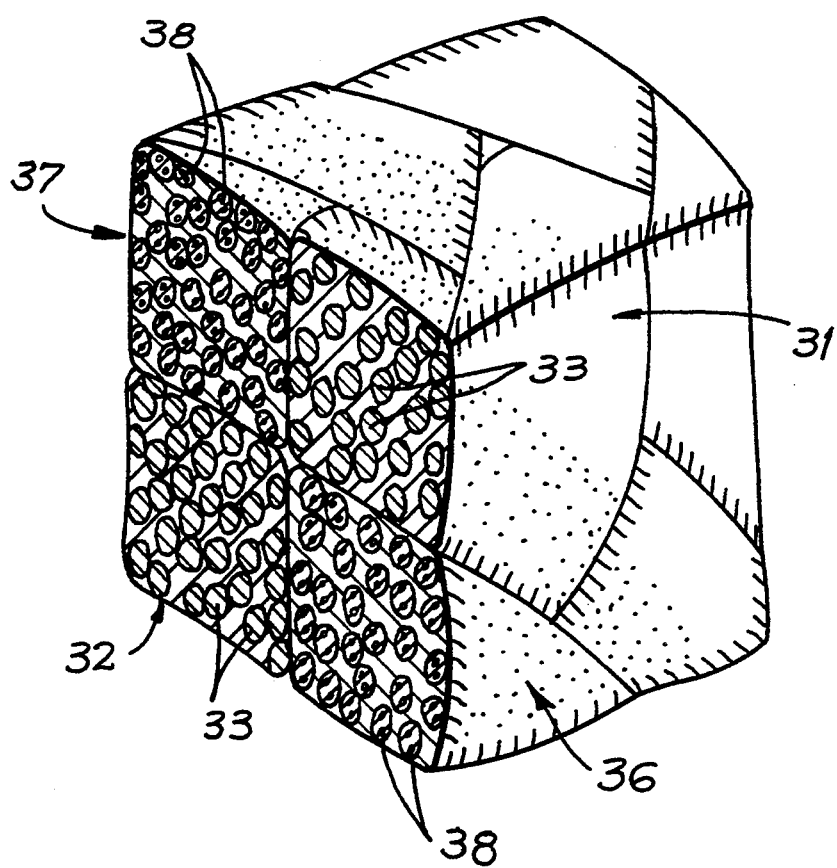
FIG. 3 is a cross-sectional perspective view of an alternate embodiment of the invention in which strands of poly(phenylene sulfide) yarn are braided with strands of PTFE fiber and impregnated with a lubricant and binder.

In the embodiment shown in FIG. 3, a strand 31 and a strand 32 of poly(phenylene sulfide) yarns 33 and a strand 36 and a strand. 37 of PTFE-carbon composite yarns 38 are braided together to form a packing. The packing is preferably impregnated with a lubricant and a binder.

When a combined yarn packing is produced by twisting a polyphenylene sulfide yarn and the polytetrafluoroethylene yarn, the following characteristics result:
Excellent chemical resistance
Excellent temperature characteristics, to 450° F.
Dimensionally stable, non-extruding
Excellent heat transfer
Excellent wear resistance, good lubricity
Dense impervious packing, resistant to contamination The two yarns complement each other because both have approximately the same chemical resistance, especially when the poly(phenylene sulfide) is impregnated with MSD-4 or polytetrafluoroethylene. The two yarns also have approximately the same temperature resistance. The poly(phenylene sulfide) yarn will accept large quantities of impregnate either as an individual fiber or as a component of a braided structure. Accordingly, the voids found in a PTFE-carbon yarn are eliminated. The poly(phenylene sulfide) yarn forms a support matrix for the polytetrafluoroethylene and prevents the extrusion that is common when PTFE is used alone. When the polytetrafluoroethylene-carbon yarn is in intimate contact with the poly(phenylene sulfide) yarn, it provides a heat path and prevents the heat buildup common to many non-heat conductive yarns including poly(phenylene sulfide) yarn.

The packing prepared in accordance with the invention has similar chemical and thermal capabilities to the polytetrafluoroethylene carbon composite, but is much more stable due to its high strength, twisted strand composition. The final product is suitable for use at temperatures up to about 500° F., for pH values in the range between about 1 and 14 and at surface velocities of approximately 2500FPM. It does not extrude and resists large particle size abrasives due to incomplete impregnation. It is heat conductive and does not cause damage to shafts on which it is used.

It is also possible to substitute a carbon coated polytetrafluoroethylene yarn for the polytetrafluoroethylene carbon composite and obtain nearly identical performance. In addition, other packings using lubricated and impregnated polytetrafluoroethylene yarn in place of the PTFE-carbon composite have been prepared. A pure polytetrafluoroethylene dispersion on the poly(phenylene sulfide) yarn and a pure polytetrafluoroethylene dispersion on the final braided product are also practical. The resulting packing materials have almost the same overall characteristics as the packing material described, with the exception that heat transfer characteristics were lower. However, for certain low speed applications, especially in the paper making industry, the other benefits are required, heat transfer characteristics are not significant and no carbon or other dark colored materials are allowed, making such alternate constructions practical and suitable for use.

It will thus be seen that the objects set forth above, among those made apparent from the preceding description, are efficiently attained and, since certain changes may be made in carrying out the above method and in the article set forth without departing from the spirit and scope of the invention, it is intended that all matter contained in the above description and shown in the accompanying drawings shall be interpreted as illustrative and not in a emitting sense.

It is also to be understood that the following claims are intended to cover all of the generic and specific features of the invention herein described and all statements of the scope of the invention which, as a matter of language, might be said to fail therebetween.

Particularly it is to be understood that in said claims, ingredients or compounds recited in the singular are intended to include compatible mixtures of such ingredients wherever the sense permits.

What is claimed is:

1. A chemically resistant packing material having improved strength and resistance to extrusion, comprising:
   a plurality of poly(phenylene sulfide) yarns which have been treated with a polytetrafluoroethylene dispersion and fine carbon particles;
   a plurality of polytetrafluoroethylene ("PTFE") yarns impregnated with carbon particles; and
   the poly (phenylene sulfide) and PTFE yarns laid up together and braided or butted to form the packing.

2. The packing material of claim 1, wherein the poly(phenylene sulfide) yarns and PTFE yarns are each present in an amount between about 25 and 75% by weight with the total amount of yarns being 100%.

3. The packing material of claim 1, wherein the poly(phenylene sulfide) yarns and PTFE yarns are each present in an amount between about 40% and 60% by weight with the total amount of yarns being 100%.

4. The packing material of claim 1, wherein the poly(phenylene sulfide) yarns and the PTFE yarns are each present in an amount of about 50% by weight.

5. The packing material of claim 1, further including an impregnate.

6. The packing material of claim 5, wherein the impregnate is a binder selected from the group consisting of dispersed polytetrafluoroethylene, dispersed graphite, dispersed carbon, starch and mixtures thereof.

7. The packing material of claim 5, further including an inorganic lubricant selected from the group consisting of $MoS_2$, $TiS_2$, $WS_2$, talc and combinations thereof in the interstices of the packing.

8. The packing material of claim 1, wherein the packing is braided and the poly(phenylene sulfide) yarn and PTFE yarn are twisted together prior to braiding to form the packing.

9. The packing material of claim 1, including a lubricant in the interstices of the packing.

10. The packing material of claim 9, wherein the lubricant is one of a petroleum or synthetic lubricant.

11. A chemically resistant packing material having increased strength and resistance to extrusion comprising:
   between about 25 to 75 weight percent poly(phenylene sulfide) yarns treated with a blend of polytetrafluoroethylene dispersion and fine carbon particles; and
   polytetrafluoroethylene yarns treated with graphite, the packing material being formed by laying up the yarns together and braiding or knitting to form the packing material.

12. The packing material of claim 11, wherein the packing is formed from twisted strands of polytetrafluoroethylene yarns and the poly(phenylene sulfide) yarns.

13. The packing material of claim 11, wherein the twisted strands are braided to form the packing.

14. The packing material of claim 1, wherein the PTFE-carbon composite yarn is impregnated with a PTFE dispersion.

* * * * *